US010632481B1

(12) United States Patent
Laible

(10) Patent No.: US 10,632,481 B1
(45) Date of Patent: Apr. 28, 2020

(54) HAND-HELD DUAL FLOW DILUTION DISPENSER

(71) Applicant: Rodney Laible, Omaha, NE (US)

(72) Inventor: Rodney Laible, Omaha, NE (US)

( * ) Notice: Subject to any disclaimer, the term of this patent is extended or adjusted under 35 U.S.C. 154(b) by 0 days.

(21) Appl. No.: 16/678,029

(22) Filed: Nov. 8, 2019

(51) Int. Cl.
*F16K 11/22* (2006.01)
*B05B 7/12* (2006.01)

(52) U.S. Cl.
CPC .................................. *B05B 7/1218* (2013.01)

(58) Field of Classification Search
CPC .... B05B 7/1209; B05B 7/1218; B05B 7/2443
See application file for complete search history.

(56) References Cited

U.S. PATENT DOCUMENTS 1,661,150 A * 2/1928 Birkenmaier ........... B05B 7/066 239/117
3,632,046 A * 1/1972 Hengesbach ......... B05B 7/2424 239/318
6,578,776 B1 * 6/2003 Shanklin ............... B05B 7/1209 239/318
7,237,728 B1 7/2007 Laible
7,296,761 B1 11/2007 Laible
8,177,143 B2 5/2012 Laible
2006/0131335 A1 * 6/2006 Hubmann ................. B05B 7/12 222/145.1
2008/0197214 A1 * 8/2008 Hubmann ................. B05B 7/12 239/310
2009/0272766 A1 * 11/2009 Laible ...................... B67D 7/02 222/325
2010/0051719 A1 * 3/2010 Carlucci ............... B05B 7/2464 239/316
2010/0213280 A1 * 8/2010 Laible ................... B05B 7/1209 239/310
2013/0214061 A1 * 8/2013 MacLean-Blevins ....................... B05B 7/1209 239/310
2014/0209706 A1 * 7/2014 Jia ............................. B05B 7/32 239/315

* cited by examiner

*Primary Examiner* — Reinaldo Sanchez-Medina
(74) *Attorney, Agent, or Firm* — Dennis L. Thomte; Thomte Patent Law Office LLC

(57) ABSTRACT

A hand-held dual flow dilution dispenser for precisely controlling the flow rate of water therethrough and for precisely injecting a liquid chemical into the water passing through the apparatus. The dispenser includes a water spool valve and a chemical spool valve with the spool valves being rotated between first and second positions. A handle is operatively connected to the first spool valve for rotating the first spool valve between the first and second positions. A linkage interconnects the handle and the second spool valve whereby rotational movement of the handle simultaneously causes rotation of the first spool valve and the second spool valve.

6 Claims, 8 Drawing Sheets

HAND-HELD DUAL FLOW DILUTION DISPENSER

BACKGROUND OF THE INVENTION

Field of the Invention

This invention relates to a hand-held dispenser and more particularly to a hand-held dual flow dispenser which is convenient to use and which is capable of controlling the flow rate of water therethrough for mixing with a liquid chemical into the water passing through the dispenser. Further, this invention relates to a hand-held dual flow dispenser which is capable of mixing precise amounts of liquid chemical into the water flowing through the dispenser. More particularly, this invention relates to a hand-held dual flow dilution dispenser which includes a linkage connected to the rotatable water flow spool valve and the rotatable chemical flow spool valve thereof whereby the spool valves may be simultaneously rotated between first and second positions and vice versa.

Description of the Related Art

Many types of dispensers have been previously provided which may be connected to the end of a water hose or the like wherein the device introduces chemicals into the water flow so that a lawn or the like may be sprayed. The devices of the prior art are also able to inject liquid chemicals into a water stream so that a mop bucket, etc., may be filled with water, detergent or other chemicals.

In Applicant's earlier U.S. Pat. Nos. 7,237,728; 7,296,761; and 8,177,143 hand-held dispensers are disclosed which are able to conveniently and economically precisely control the rate of water flow through the dispenser and to precisely control the metering of liquid chemicals in the precisely controlled flow of water. The dispensers of Applicant's earlier patents have met with considerable success. However, in Applicant's earlier hand-held dispensers, a rotatable water flow spool valve controlled the flow of water through the dispenser and a rotatable chemical flow spool valve controlled the flow of chemical into the water passing through the dispenser. The water flow spool valve and the chemical flow spool valve of the prior art dispensers were individually controlled. Applicant has developed an improved hand-held dual flow dilution dispenser wherein the water flow spool valve and the chemical flow spool valve are connected by a linkage whereby the spool valves may be simultaneously rotated between first and second positions and vice versa.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hand-held dual flow dilution dispenser is described for precisely and conveniently controlling the flow rate of water therethrough so that a liquid chemical or the like may be mixed in a precisely controlled amount with the water passing therethrough. The dispenser includes a body member having a generally horizontally disposed first body portion having a first side, a second side, an inlet end and a discharge end. The body member also includes a generally vertically disposed second body portion having a first side, a second side, an upper end and a lower end. The second body portion extends downwardly from the first body portion with the lower end of the second body portion being configured to be secured to a liquid container. The first body portion has a horizontally disposed first passageway formed therein which extends from the inlet end thereof towards the discharge end thereof with the first passageway having an inlet end and a discharge end. The dispenser also includes a water valve housing having an inlet end and a discharge end with the inlet end of the water valve housing being configured to be in fluid communication with a source of water under pressure. The discharge end of the water valve housing is in fluid communication with the inlet end of the first passageway. A vertically disposed and spring-loaded water valve is positioned in the water valve housing with the water valve being moved between a normally closed position to an open position. The water valve includes an elongated valve actuator, having upper and lower ends, which extends upwardly therefrom so that the upper end of the valve actuator is exposed above the water valve housing. The valve actuator and the water valve are vertically movable between upper and lower positions with the water valve being closed when the valve actuator and the water valve are in their upper positions. The water valve is in the open position when the valve actuator and the water valve are in the lower positions. A water valve actuating lever is typically secured to the first body portion which is in engagement with the valve actuator for selectively moving the valve actuator downwardly from the upper position to the lower position to open the water valve.

The first body portion has a horizontally disposed and transversely extending first cylindrical spool opening formed therein. The first cylindrical spool opening has a water inlet side and a water discharge side with the water inlet side of the first cylindrical spool opening being in fluid communication with the discharge end of the first passageway. The first spool valve, has first and second ends, which is selectively rotatably mounted in the first cylindrical spool opening. The first spool valve is rotatably movable between first and second positions in the first cylindrical spool opening. The first spool valve has a first bore extending therethrough with the first spool valve also having a second bore extending therethrough which is angularly disposed at a 90 degree angle with respect to the first bore thereof. The first body portion has an elongated and horizontally disposed second passageway, having an inlet end and a discharge end, which extends forwardly from the water discharge side of the first cylindrical spool opening to the discharge end of the first body portion. A vertically disposed and elongated third passageway, having upper and lower ends, extends downwardly from the second passageway intermediate the length of the second passageway. The second body portion has a horizontally disposed and transversely extending second cylindrical spool opening formed therein. The second cylindrical spool opening has a lower inlet end and an upper discharge side with the upper discharge side of the second cylindrical spool opening being in fluid communication with the lower end of the third passageway. A second spool valve, having first and second ends, is selectively rotatably mounted in the second cylindrical spool opening with the second spool valve being rotatably movable between first and second positions in the second cylindrical spool opening. The second spool valve has a first bore extending therethrough and a second bore extending therethrough which is angularly disposed at a 90 degree angle with respect to the first bore thereof.

A vertically disposed fourth passageway, having an upper end and a lower end, has its upper discharge end being in fluid communication with the lower inlet side of the second cylindrical spool opening. The lower intake end of the fourth passageway is in fluid communication with a source of liquid chemical. The dispenser also includes an elongated handle, having an inner end and an outer end, with the handle being rotatably movable between first and second positions. The inner end of the handle is operatively connected to the first spool valve whereby rotation of the handle causes the first spool valve to be rotated from the first position to the second position and from the second position to the first position. The dispenser also includes a linkage which interconnects the handle and the second spool valve whereby rotational movement of the handle simultaneously causes rotation of the first spool valve and the second spool valve.

A principal object of the invention is to provide an improved hand-held dual flow dilution dispenser.

A further object of the invention is to provide a hand-held dual flow dilution dispenser which includes a water spool valve and a chemical spool valve which includes means for simultaneously rotating the water spool valve and the chemical spool valve thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
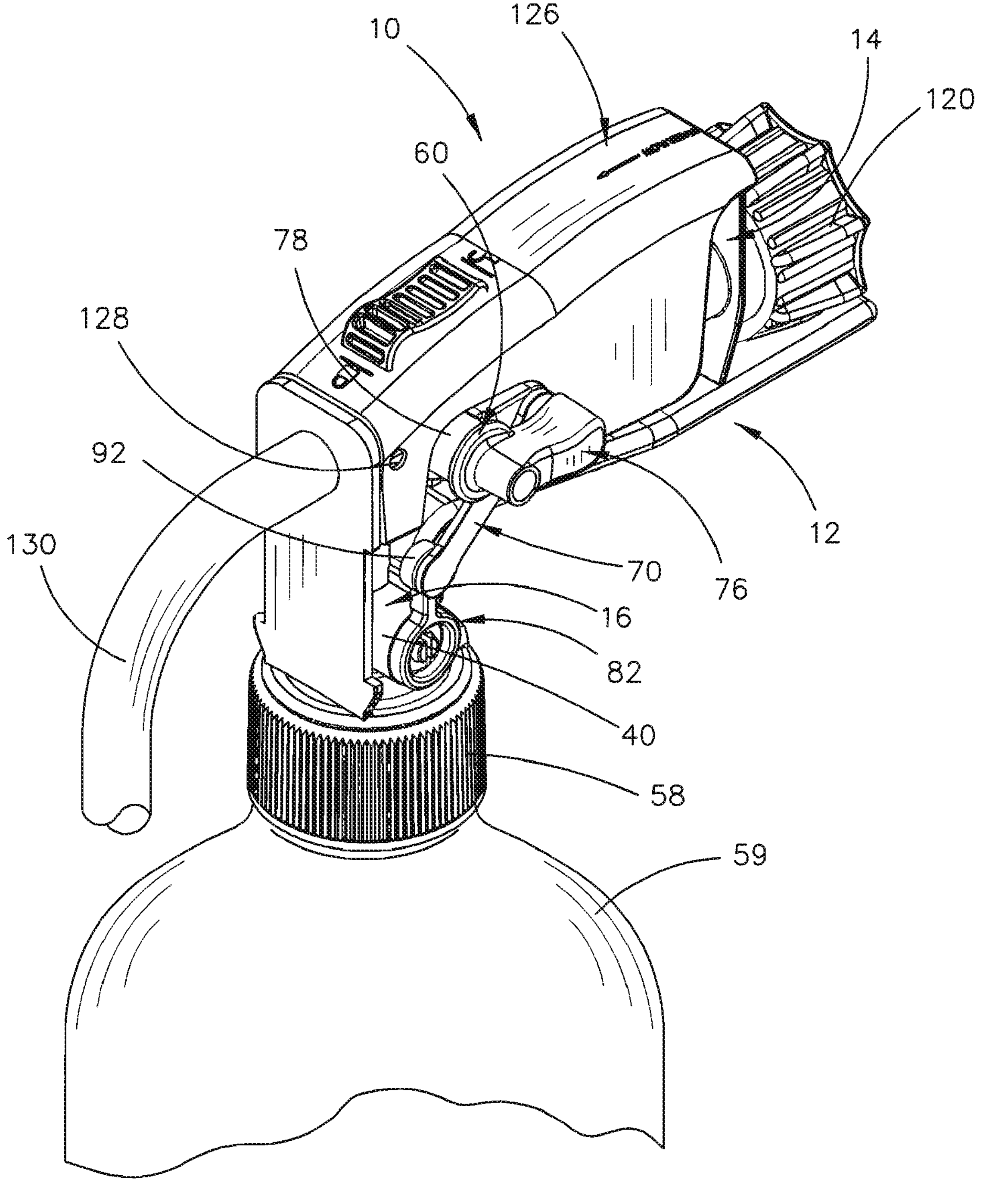
FIG. 1 is a left-hand frontal perspective view of the hand-held dual flow dilution dispenser of this invention mounted on a chemical container.
Figure 2:
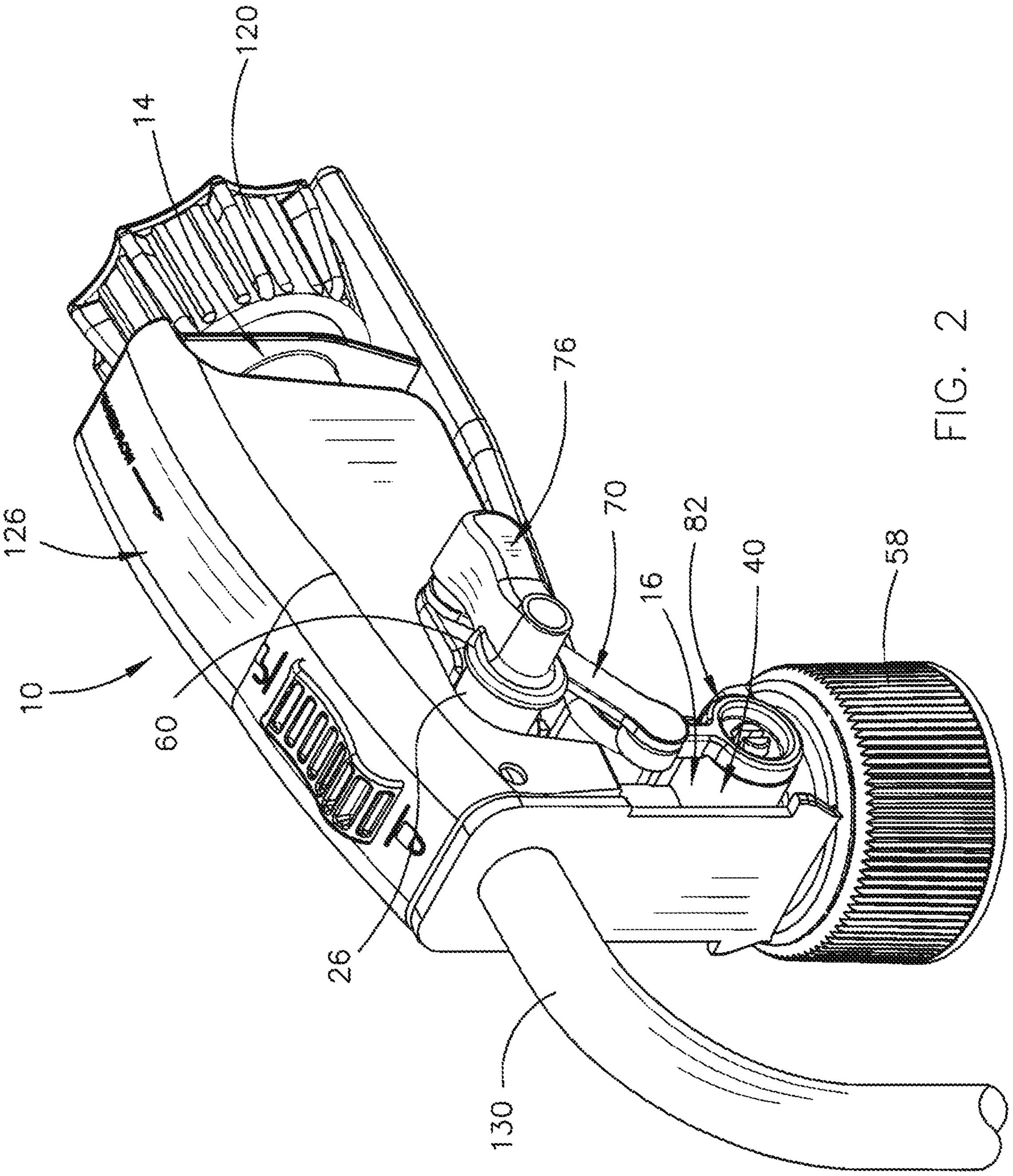
FIG. 2 is another left-hand frontal perspective view of the hand-held dual flow dilution dispenser of this invention mounted on a chemical container.
Figure 3:
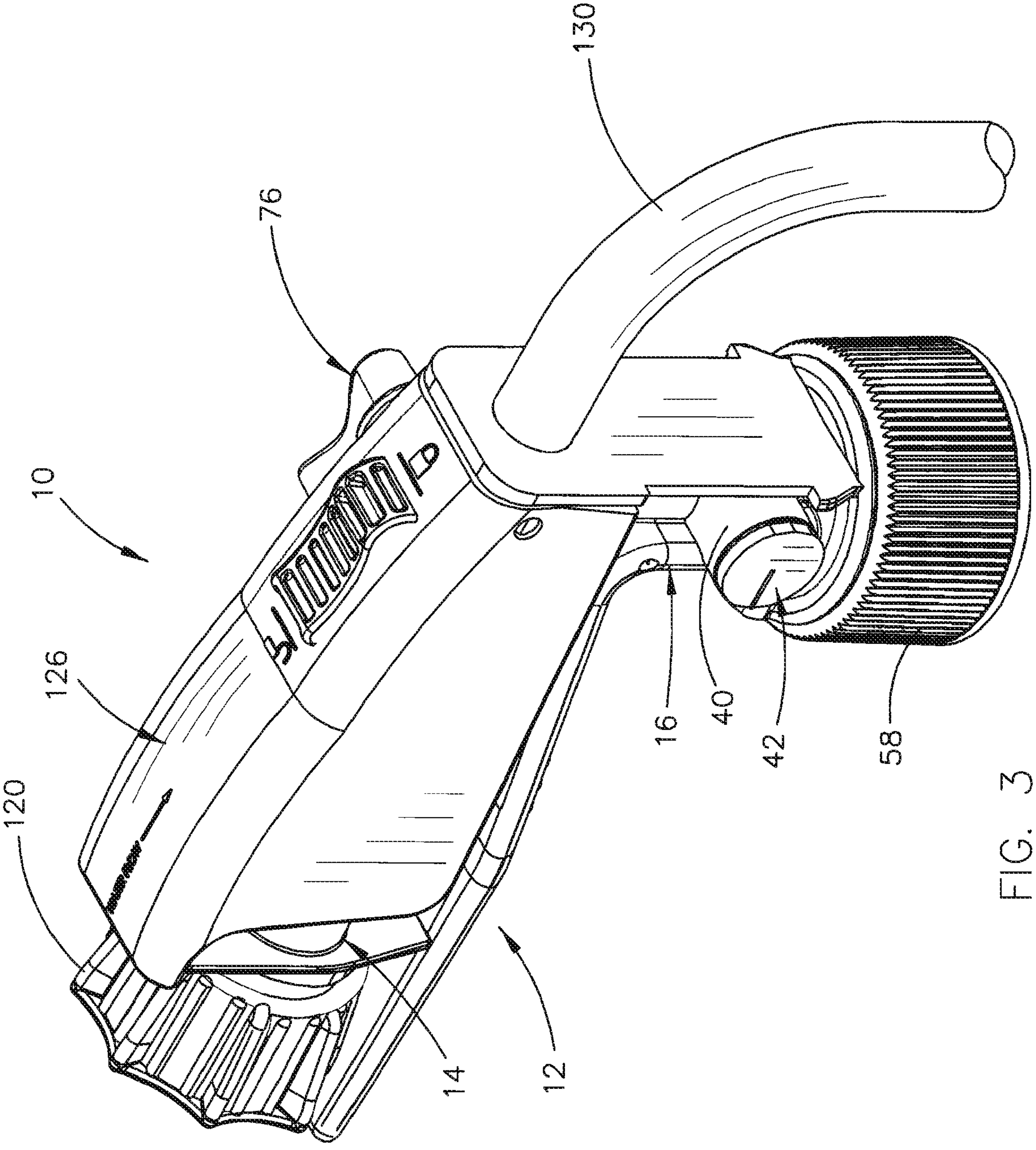
FIG. 3 is a right-hand frontal perspective view of the hand-held dual flow dilution dispenser of this invention mounted on a chemical container.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The hand-held dual flow dilution dispenser of this invention is referenced to generally by the reference numeral 10 which includes a dispenser body 12 which includes a generally horizontally disposed body portion 14 and a generally vertically disposed body portion 16. Obviously, body portion 14 will not always be horizontally disposed when being used nor will body portion 16 always be substantially vertically disposed when in use.

Body portion 14 includes an inlet end 18 and a discharge end 19. The inlet end 18 of body portion 14 has a hollow cylindrical member 20 formed therewith which has an inlet end 22 and a discharge end 23. Cylindrical member 20 has a horizontally disposed water passageway 24 (FIG. 6) formed therein which extends horizontally forwardly therefrom. An air gap assembly 25 is positioned within cylinder member 20. Body portion 14 includes a horizontally disposed and transversely extending cylindrical member 26 having a chamber 28 formed therein. Chamber 28 of cylindrical member 26 communicates with the forward end of water passageway 24.

Figure 4:
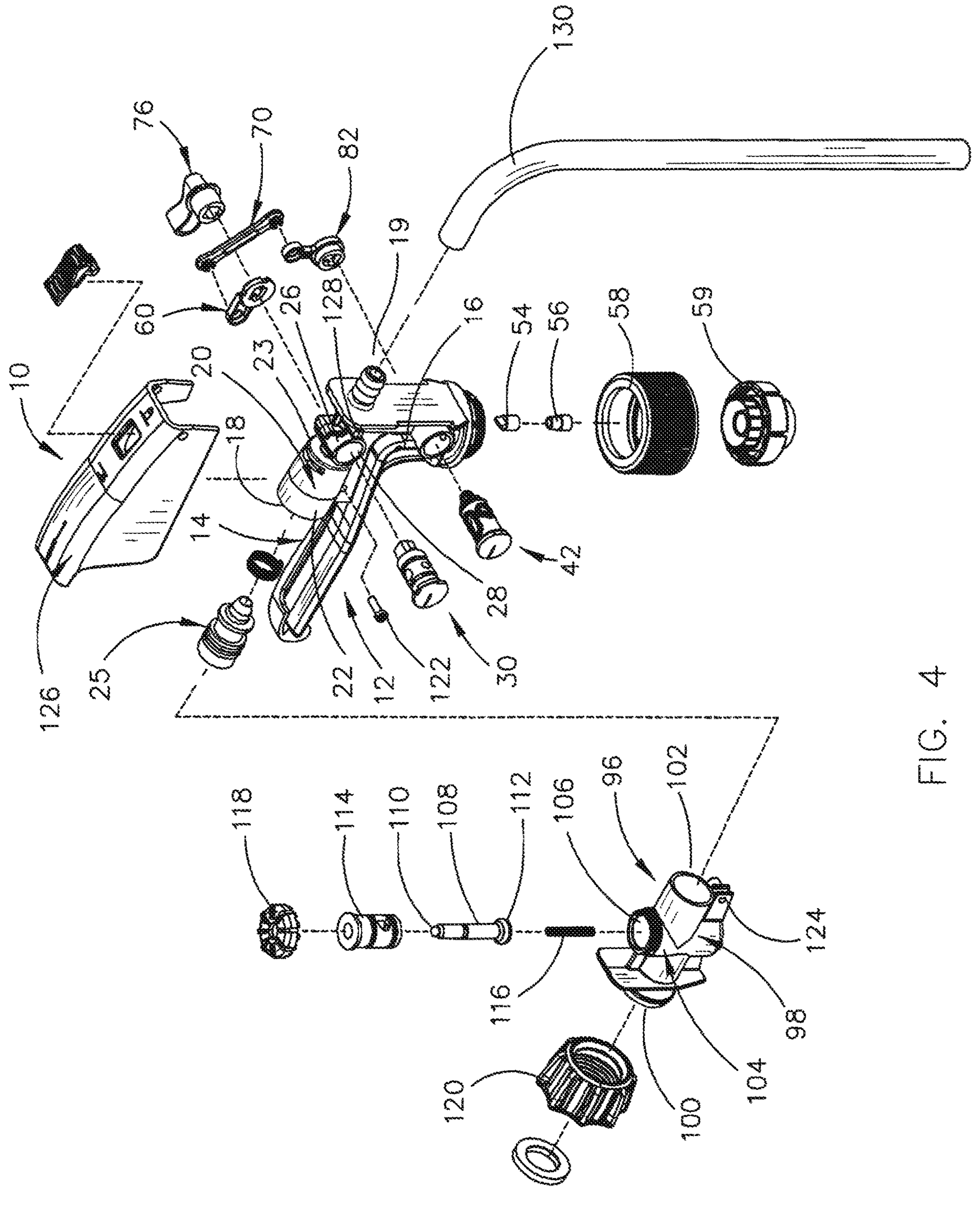
FIG. 4 is an exploded perspective view of the hand-held dual flow dilution dispenser of this invention mounted on a chemical container.
Figure 4A:
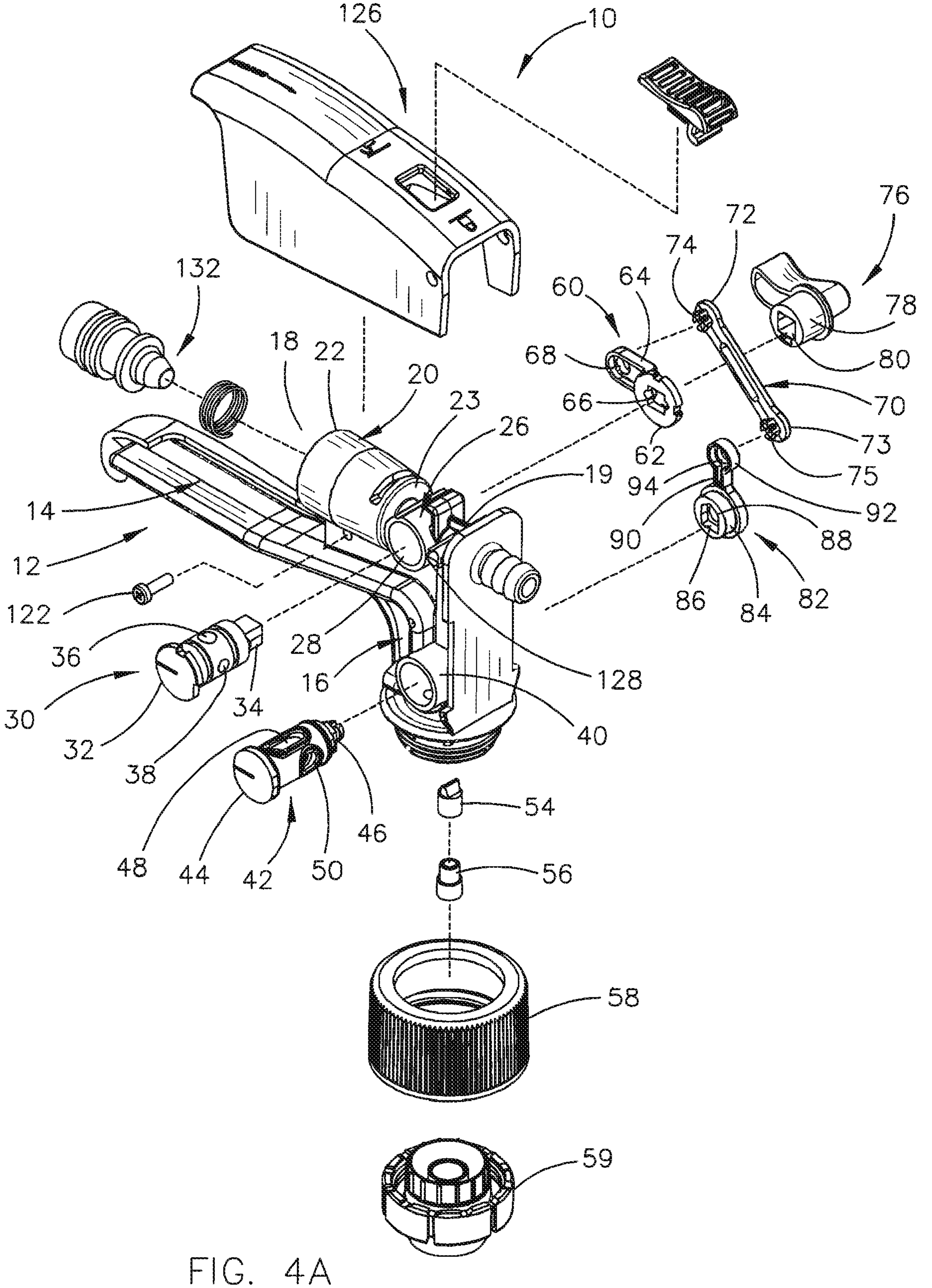
FIG. 4A is a partial exploded perspective view of the hand-held dual flow dilution dispenser of this invention mounted on a chemical container.
Figure 5:
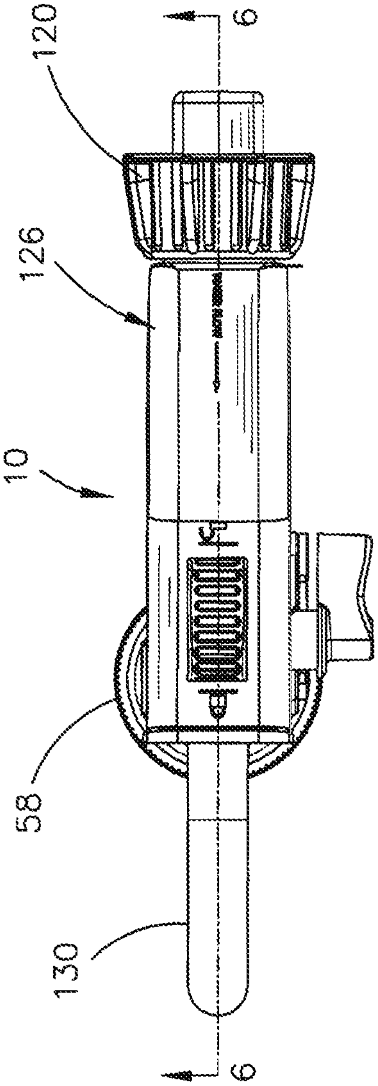
FIG. 5 is a top view of the hand-held dual flow dilution dispenser of this invention mounted on a chemical container.
Figure 6:
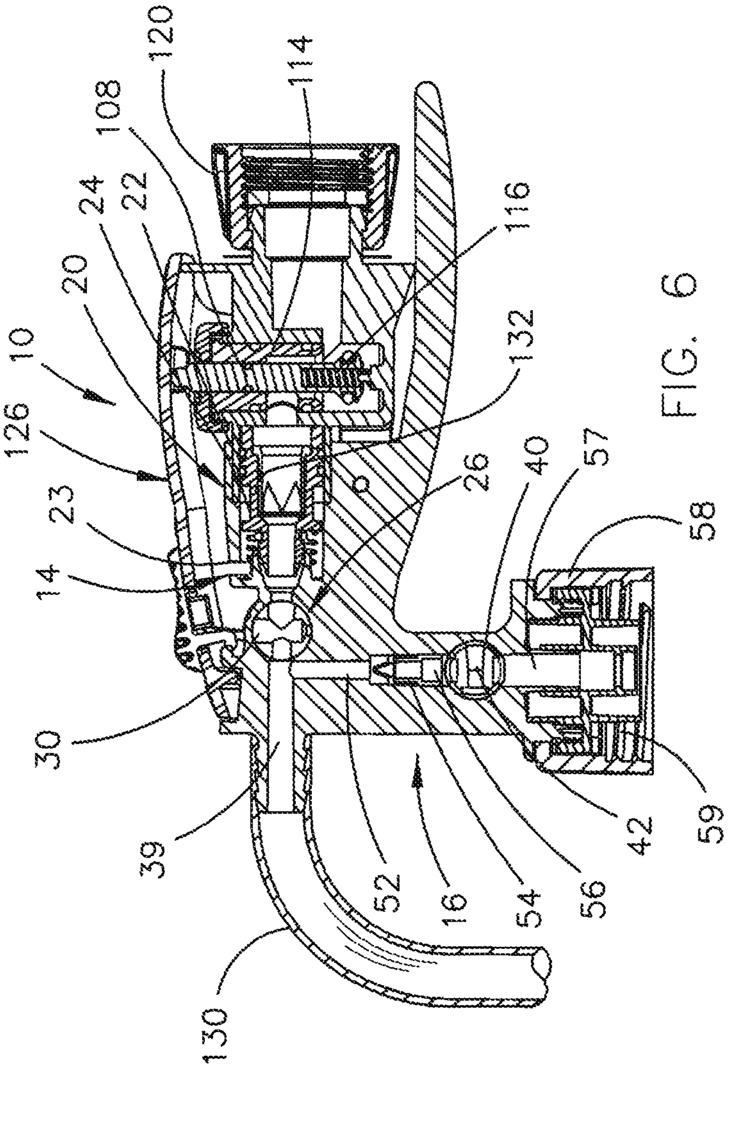
FIG. 6 is a sectional view of the hand-held dual flow dilution dispenser of this invention as seen on lines 6-6 of FIG. 5.

An elongated and cylindrical water flow spool valve 30 is selectively rotatably mounted in chamber 28. An end plate or disc 32 is secured to one end of spool valve 30 outwardly of cylindrical member 26 for rotation with spool valve 30. The other end 34 of spool valve 30 is square-shaped as seen in FIG. 4A. Spool valve 30 has a first bore 36 formed therein which extends transversely therethrough. Spool valve 30 also has a second bore 38 formed therein which is disposed 90 degrees from bore 36. Bore 36 has a larger diameter than bore 38. Body portion 14 has an elongated passageway 39 formed therein which extends from the discharge side of spool valve 30 to the discharge end of body portion 14 as seen in FIG. 6.

Body portion 16 includes a horizontally disposed and transversely extending cylindrical member 40 formed therein which has an elongated spool valve 42 rotatably mounted therein. Cylindrical member 40 has a discharge side and an inlet side. Spool valve 42 includes an outer end 44, a square-shaped inner end 46 and bores 48 and 50 formed therein which extend therethrough. As seen, bore 48 has a larger diameter than bore 50 with the bores 48 and 50 being spaced 90 degrees apart. An elongated passageway 52 extends from the discharge side of cylindrical member 40 to the passageway 39. Elements 54 and 56 are positioned in passageway 52 at the lower end thereof. Passageway 57 extends from the inlet side of cylindrical member 40 to the lower end of body portion 16.

A cap 58 is threadably secured to the lower end of body portion 16. Cap 58 has an insert 59 positioned therein which is configured to have a single draw straw or dual draw straws extending therefrom into a chemical container 59 such as a bottle or the like.

The numeral 60 refers to a link member having a disc-shaped portion 62 and an arm 64 extending therefrom. Disc-shaped portion 62 of link member 60 has a square opening 66 formed therein which receives end 34 of spool valve 30 extending outwardly therethrough. The outer end of arm 64 has an opening 68 formed therein. Thus, rotation of link member 66 will cause spool valve 30 to be rotated.

The numeral 70 refers to an elongated link member having ends 72 and 73. End 72 has an inwardly protruding portion 74 which is pivotally received in opening 68 of arm 64 of link member 60. End 73 of link member 70 has an inwardly protruding portion 75. The numeral 76 refers to a handle or knob which has a cylindrical connector portion 78 extending inwardly therefrom. Connector portion 78 has a square-shaped opening 80 formed therein. The handle 76 is secured to the end 34 of spool valve 30 by the end 34 of spool valve 30 being received in opening 80 of connector portion 78 whereby rotation of handle 76 will cause spool valve 30 to be rotated, will cause link member 60 to be rotated and will cause link member 70 to be rotated or pivoted.

The numeral 82 refers to a link member which includes a disc-shaped or cylindrical portion 84 having a square-shaped opening 86 formed therein. The outer end of opening 86 communicates with a round opening 88 formed in cylindrical portion 84. Link member 82 has an arm 90 extending from cylindrical portion 84. Arm 90 has a disc member 92 secured thereto which has a circular opening 94 formed therein.

Link member 82 is secured to the square-shaped inner end 46 of spool valve 42 by square opening 86 of link member 82 receiving the square-shaped inner end 46 of spool valve 42 therein. The inwardly protruding portion 75 at end 73 of link member 82 is pivotally received in opening 94 in link member 82. Thus, the pivotal movement of handle 76 causes the various link members to simultaneously rotate spool valves 30 and 42.

The numeral 96 refers to a water inlet assembly which is secured to the inlet end 18 of body portion 14. Assembly 96 includes a housing 98 having a water inlet end 100 and a water discharge end 102. Housing 98 includes a vertically disposed hollow tube 104 having an open upper end 106 and a closed bottom. Assembly 96 includes a conventional valve seat (not shown) in tube 104. Assembly 96 also includes a conventional spring loaded valve stem 108 having an upper end 110 and a valve 112 at the lower end thereof. Valve stem 108 is vertically movable within the valve guide 114. Spring 116 yieldably urges the valve stem 108 upwardly so that the valve 112 is normally closed onto the valve seat. Valve stem 108 passes upwardly through the cap 118 which closes the upper end of tube 104. A conventional water coupler 120 is connected to the inlet end 100 of housing 98. A conventional water hose may be threaded to coupler 120 to provide a source of water to the assembly 96. The end of 102 of housing 98 is inserted into the inlet end 22 of cylindrical member 20. Assembly 96 is secured to the body portion 14 by a screw 122 extending through the bracket 124 into the body portion 14.

The numeral 126 refers to an actuating lever having its forward end pivotally secured to body portion 14 and 128. The underside of lever 126 engages the upper end 110 of valve stem 108 so that downward pivotal movement of lever 126 will cause valve stem 108 to be moved downwardly so that the valve 112 will be opened to permit water to flow therethrough to the inlet end 18 of body portion 14. The numeral 130 refers to a tube which is secured to the discharge end of the dispenser 10.

Figure 7A:
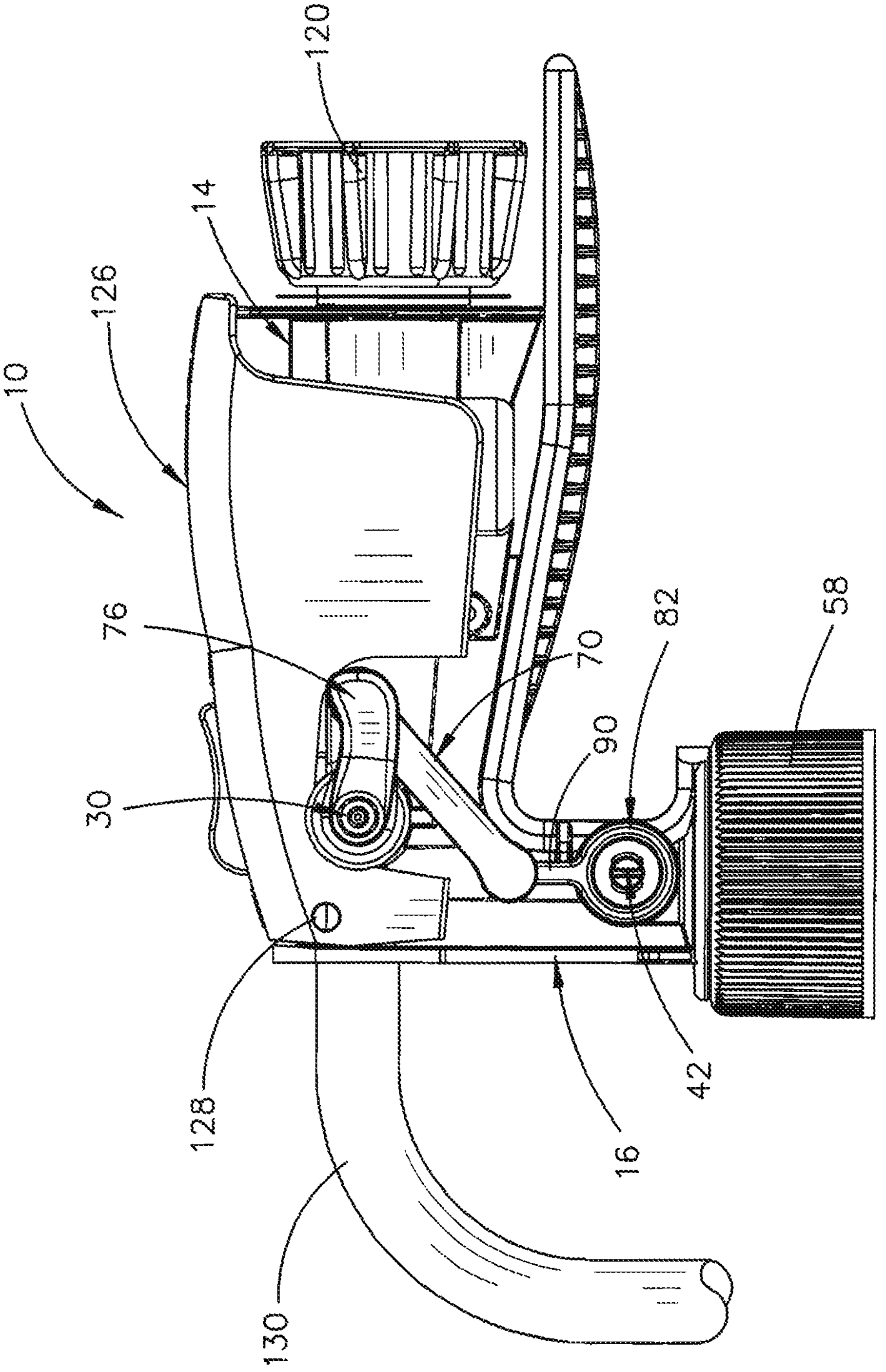
FIG. 7A is a left side view of the hand-held dilution dispenser of this invention with the spool valve linkage thereof in a first position.
Figure 7B:
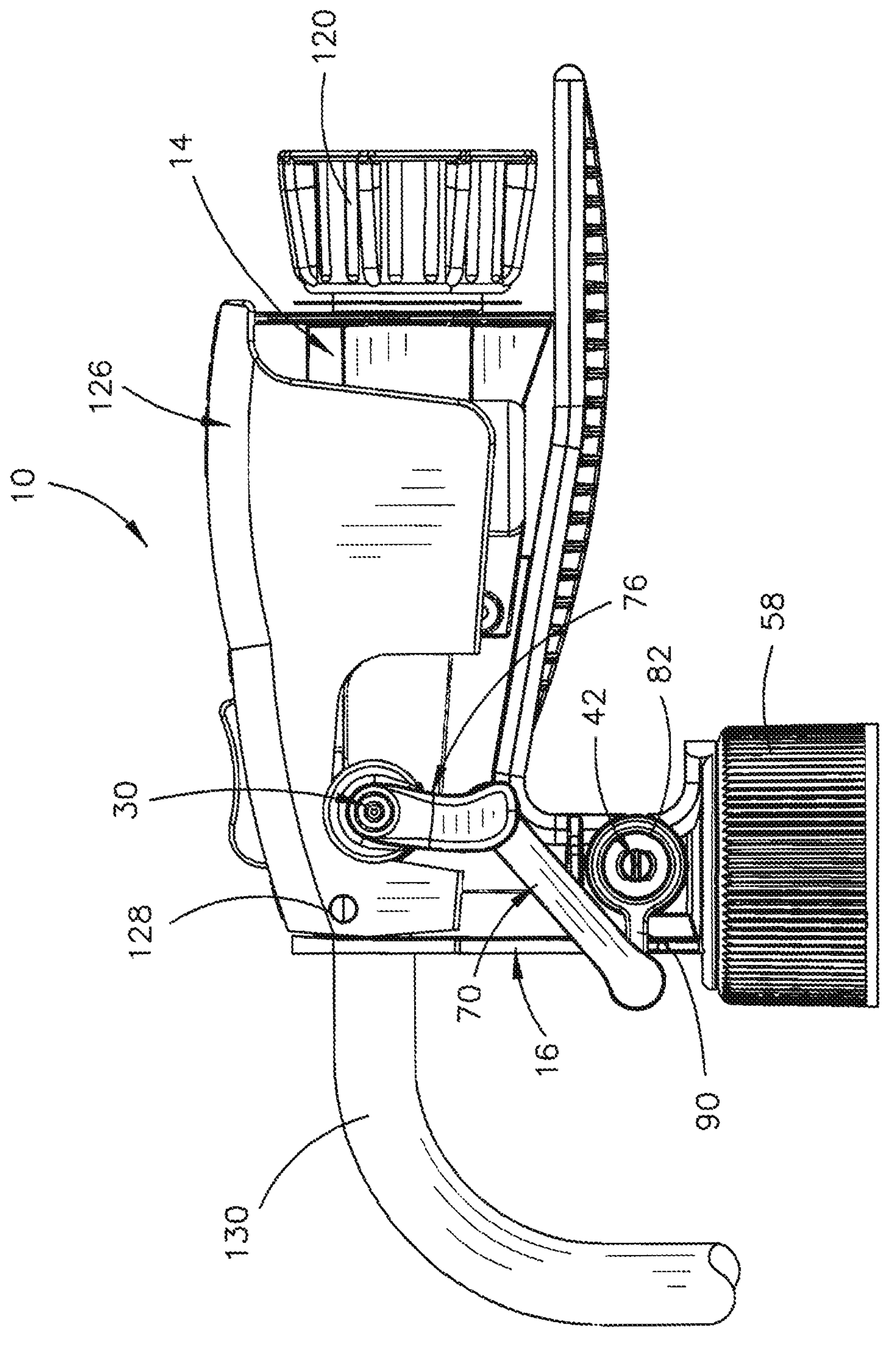
FIG. 7B is a left side view of the hand-held dilution dispenser of this invention with the spool valve linkage thereof in a second position.

The operation of the dispenser 10 will now be described. A garden hose or the like is attached to the inlet side 100 of the water valve housing 96. At that time, the valve 112 will be closed. At that time, the handle 76 will be in its first position (FIG. 7A) and the spool valve 30 will be in its first position whereby the bore 38 thereof will be in communication with the passageway 24. At that time, spool valve 42 will be in its first position whereby the bore 50 thereof will be in communication with the passageway 57.

If it is desired to spray a water/chemical solution onto a yard or other area, the actuating lever 126 will be depressed so that valve stem 108 will be moved downwardly to open the valve 112. Water will be discharged to the rearward end of body portion 14 and will pass through bore 38 of spool valve 30 into passageway 39. The movement of the water through passageway 39 creates a suction at the upper end of passageway 52 and passageway 53 causing chemical to be drawn upwardly from the container 59 by way of a single draw straw or by way of dual draw straws through bore 50 of spool valve 42. The chemical from the container 59, passes into passageway 39 and into tube 130.

If the user desires to increase the amount of chemical being injected into the water, the handle 76 is pivotally moved 90 degrees in a clockwise manner to its second position, which causes spool valve 32 to be rotated 90 degrees so that the larger bore 36 in spool valve 32 is in communication with passageway 39. Simultaneously, the spool valve 47 will be rotated 90 degrees so that the larger bore 48 thereof communicates with passageway 52.

At any time, the spool valves 30 and 42 may be simultaneously moved from their first position to their second position and vice versa.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention, Since many embodiments of the invention can be practiced without departing from the spirit and scope of the invention, the invention resides in the claims hereinafter appended.

I claim:

1. A handheld dual flow dilution dispenser for controlling the flow rate of water therethrough and for injecting a liquid chemical into the water passing through the dispenser, comprising:

a body member;

said body member including a generally horizontally disposed first body portion having a first side, a second side, an inlet end and a discharge end;

said body member also including a generally vertically disposed second body portion having a first side, a second side, an upper end and a lower end;

said second body portion extending downwardly from said first body portion;

said lower end of said second body portion being configured to be secured to a liquid container;

said first body portion having a horizontally disposed first passageway formed therein which extends from said inlet end thereof towards said discharge end thereof;

said first passageway having an inlet end and a discharge end;

a water valve housing having an inlet end and a discharge end;

said discharge end of said water valve housing being in fluid communication with said inlet end of said first passageway;

said inlet end of said water valve housing being configured to be in fluid communication with a source of water under pressure;

a vertically disposed and spring loaded water valve imposed in said water valve housing which is movable between a normally closed position to an open position;

said water valve having an elongated valve actuator, having upper and lower ends, which extends upwardly therefrom so that said upper end of said valve actuator is exposed above said water valve housing;

said valve actuator and said water valve being vertically movable between upper and lower positions;

said water valve being closed when said valve actuator and said water valve are in said upper positions;

said water valve being in said open position when said valve actuator and said water valve are in said lower positions;

a water valve actuating lever pivotally secured to said first body portion which is in engagement with said valve actuator for selectively moving said valve actuator downwardly from said upper position to said lower position to open said water valve;

said first body portion having a horizontally disposed and transversely extending first cylindrical spool opening formed therein;

said first cylindrical spool opening having a water inlet side and a water discharge side;

said water inlet side of said first cylindrical spool opening being in fluid communication with said discharge end of said first passageway;

a first spool valve, having first and second ends, selectively rotatably mounted in said first cylindrical spool opening;

said first spool valve being rotatably movable between first and second positions in said first cylindrical spool opening;

said first spool valve having a first bore extending therethrough;

said first spool valve having a second bore extending therethrough which is angularly disposed with respect to said first bore thereof;

said first body portion having an elongated and horizontally disposed second passageway, having an inlet end and a discharge end, extending forwardly from said water discharge side of said first cylindrical spool opening to said discharge end of said first body portion;

a vertically disposed and elongated third passageway, having upper and lower ends, extending downwardly from said second passageway intermediate the lower length of said second passageway;

said second body portion having a horizontally disposed and transversely extending second cylindrical spool opening formed therein;

said second cylindrical spool opening having a lower inlet side and an upper discharge side;

said upper discharge side of said second cylindrical spool opening being in fluid communication with said lower end of said third passageway;

a second spool valve, having first and second ends, selectively rotatably mounted in said second cylindrical spool opening;

said second spool valve being rotatably movable between first and second positions in said second cylindrical spool opening;

said second spool valve having a first bore extending therethrough;

said second spool valve having a second bore extending therethrough which is angularly disposed with respect to said first bore thereof;

a vertically disposed fourth passageway having an upper discharge end and a lower inlet end;

said upper discharge end of said fourth passageway being in fluid communication with said lower inlet side of said second cylindrical spool opening;

said lower intake end of said fourth passageway being in fluid communication with a source of liquid chemical;

an elongated handle having an inner end and an outer end;

said handle being rotatably movable between first and second positions;

said inner end of said handle being operatively connected to said first spool valve whereby rotation of said handle causes said first spool valve to be rotated;

from said first position to said second position and from said second position to said first position; and a linkage interconnecting said handle to said second spool valve whereby rotational movement of said handle simultaneously causes rotation of said second spool valve as said first spool valve is rotated by said handle.

2. The hand-held dual flow dilution dispenser of claim 1 wherein said second bore of said first spool valve has a greater diameter than said first bore of said first spool valve and wherein said second bore of said second spool valve has a greater diameter than said first bore of said second spool valve.

3. A hand-held dual flow dilution dispenser for controlling the flow rate of water therethrough and for injecting a liquid chemical into the water passing through the dispenser, comprising:

a body member;

said body member including a generally horizontally disposed first body portion having a first side, a second side, an inlet end and a discharge end;

said body member also including a generally vertically disposed second body portion having a first side, a second side, an upper end and a lower end;

said second body portion extending downwardly from said first body portion;

said lower end of said second body portion being configured to be secured to a liquid container;

said first body portion having a horizontally disposed first passageway formed therein which extends from said inlet end thereof towards said discharge end thereof;

said first passageway having an inlet end and a discharge end;

a water valve housing having an inlet end and a discharge end;

said inlet end of said water valve housing being configured to be in fluid communication with a source of water under pressure;

said discharge end of said water valve housing being in fluid communication with said inlet end of said first passageway;

a vertically disposed and spring loaded water valve is positioned in said water valve housing which is movable between a normally closed position to an open position;

said water valve including an elongated valve actuator, having upper and lower ends, which extends upwardly therefrom so that said upper end of said valve actuator is exposed above said water valve housing;

said valve actuator and said water valve being vertically movable between upper and lower positions;

said water valve being closed when said valve actuator and said water valve are in said upper positions;

said water valve being in said open position when said valve actuator and said water valve are in said lower positions;

a water valve actuating lever pivotally secured to said first body portion which is in engagement with said valve actuator for selectively moving said valve actuator downwardly from said upper position to said lower position to open said water valve;

said first body portion having a horizontally disposed and transversely extending first cylindrical spool opening formed therein;

said first cylindrical spool opening having a water inlet side and a water discharge side;

said water inlet side of said first cylindrical spool opening being in fluid communication with said discharge end of said first passageway;

a first spool valve, having first and second ends, selectively rotatably mounted in said first cylindrical spool opening;

said first spool valve being rotatably movable between first and second positions in said first cylindrical spool opening;

said first spool valve having a first bore extending therethrough;

said first spool valve having a second bore extending therethrough which is angularly disposed at a 90 degree angle with respect to said first bore thereof;

said first body portion having an elongated and horizontally disposed second passageway, having an inlet end and a discharge end, extending forwardly from said water discharge side of said first cylindrical spool opening to said discharge end of said first body portion;

a vertically disposed and elongated third passageway, having upper and lower ends, extending downwardly from said second passageway intermediate the length of said second passageway;

said second body portion having a horizontally disposed and transversely extending second cylindrical spool opening formed therein;

said second cylindrical spool opening having a lower inlet side and an upper discharge side;

said upper discharge side of said second cylindrical spool opening being in fluid communication with said lower end of said third passageway;

a second spool valve, having first and second ends, selectively rotatably mounted in said second cylindrical spool opening;

said second spool valve being rotatably movable between first and second positions in said second cylindrical spool opening;

said second spool valve having a first bore extending therethrough;

said second spool valve having a second bore extending therethrough which is angularly disposed at a 90 degree angle with respect to said first bore thereof;

a vertically disposed fourth passageway having an upper discharge end and a lower inlet end;

said upper discharge end of said fourth passageway being in fluid communication with said lower inlet side of said second cylindrical spool opening;

said lower intake end of said fourth passageway being in fluid communication with a source of liquid chemical;

an elongated handle having an inner end and an outer end;

said handle being rotatably movable between first and second positions;

said inner end of said handle being operatively connected to said first spool valve whereby rotation of said handle causes said first spool valve to be rotated from said first position to said second position and from said second position to said first position; and a linkage interconnecting said handle and said second spool valve whereby rotational movement of said handle simultaneously causes rotation of said first spool valve and second spool valve.

4. The hand-held dual flow dilution dispenser of claim 3 wherein said first bore of said first spool valve has a greater diameter than said second bore of said first spool valve and wherein said first bore of said second spool valve has a greater diameter than said second bore of said second spool valve.

5. The hand-held dual flow dilution dispenser of claim 3 wherein said linkage includes:

(a) a first link member having a disc portion with a square opening formed therein which receives said inner end of said first spool valve whereby rotational movement of said disc portion causes said first spool valve to be rotated;

(b) said disc portion of said first link member having a first elongated arm, having inner and outer ends, extending therefrom;

(c) an elongated second link member having upper and lower ends;

(d) said upper end of said second link member being pivotally secured to said arm of said first link member at said outer end thereof;

(e) a third link member including a disc portion having a square opening formed therein which receives said inner end of said second spool member whereby rotational movement of said disc portion thereof will cause rotation of said second spool member;

(f) said third link member having an elongated arm, having inner and outer ends, which extends from said disc portion thereof;

(g) said second end of said second link member being pivotally secured to said elongated arm of said third link member at said outer end of said arm thereof;

and wherein said handle has a square opening formed therein which receives said inner end of said first spool valve outwardly of said disc portion of said first link member.

6. A hand-held dispenser apparatus for controlling the flow rate of water therethrough and for injecting a liquid chemical into the water passing through the apparatus, comprising:

a body member;

said body member including a generally horizontally disposed first body portion having first and second sides, an inlet end and a discharge end;

said body member also including a generally vertically disposed second body portion, having opposite sides, extending downwardly from said first body portion;

said second body portion having a lower end adapted to be secured to a liquid container;

said first body portion having a horizontally disposed and transversely extending first cylindrical spool opening formed therein having a water inlet side and a water discharge side;

a first spool valve selectively rotatably positioned in said first cylindrical spool opening for controlling the water flow rate therethrough;

said first spool valve having first and second ends;

said second body portion having a vertically disposed and transversely extending second cylindrical spool opening formed therein having a lower liquid chemical side and an upper liquid chemical side;

said lower liquid chemical side of said second cylindrical spool opening being in fluid communication with the liquid chemical in the liquid container;

a second spool valve selectively rotatably positioned in said second cylindrical spool opening for controlling the liquid chemical flow rate therethrough;

said second spool valve having first and second ends;

said upper liquid chemical spool opening being in fluid communication with the water passing outwardly from said water discharge side of said first cylindrical spool opening;

said water and chemical therein being in fluid communication with said discharge end of said first body portion;

a handle operatively connected to said second end of said first spool valve for rotating said first spool valve; and a linkage interconnecting said handle with said second end of said second spool valve whereby rotation of said handle simultaneously rotating said first and second spool valves.

* * * * *